July 27, 1937.
H. J. HORN
2,088,109
VEHICLE WHEEL
Filed May 1, 1935
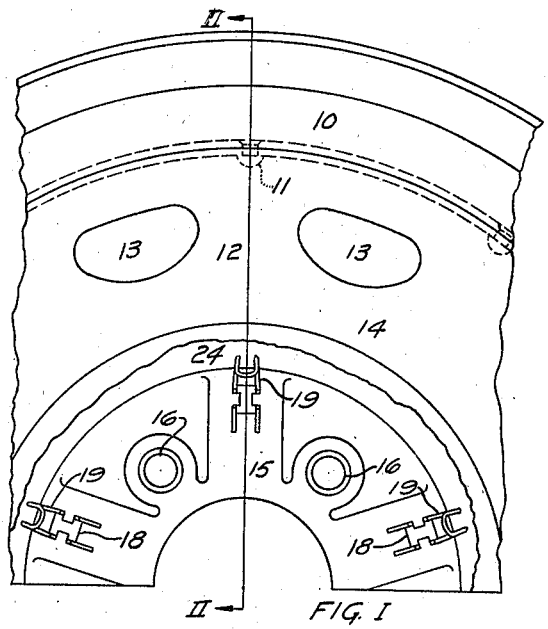
FIG. I
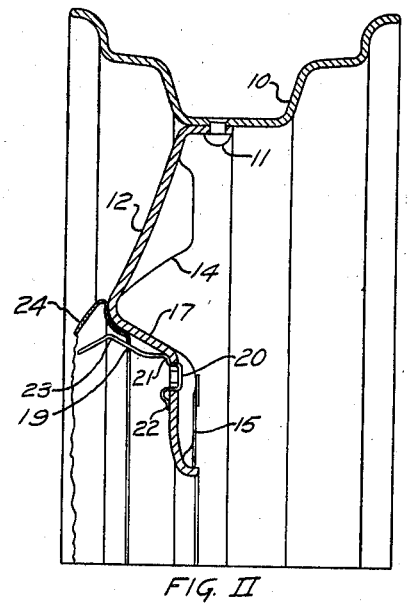
FIG. II
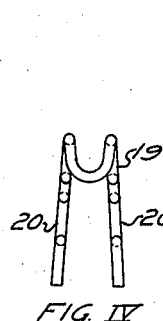
FIG. IV
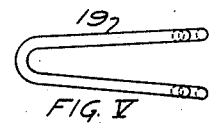
FIG. V
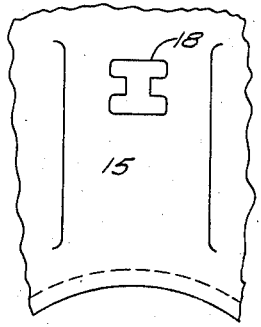
FIG. III
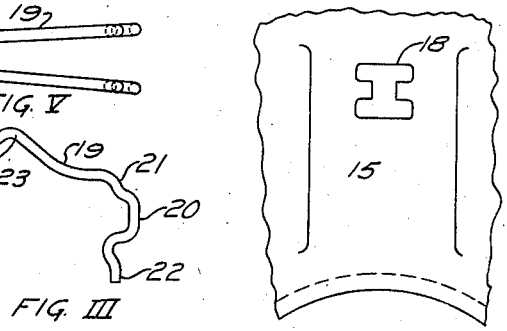
FIG. VI
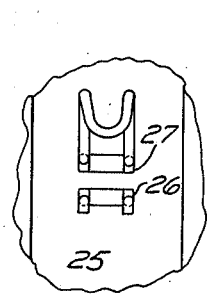
FIG. VIII
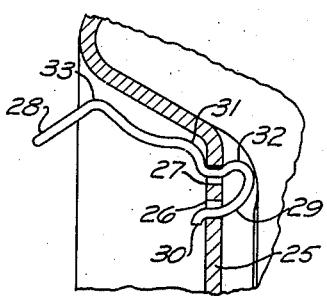
FIG. VII
INVENTOR.
HARRY J. HORN
BY Carroll R. Taber
ATTORNEY.

Patented July 27, 1937

2,088,109

UNITED STATES PATENT OFFICE 2,088,109

VEHICLE WHEEL

Harry J. Horn, Lansing, Mich., assignor to Motor Wheel Corporation, Lansing, Mich., a corporation of Michigan Application May 1, 1935, Serial No. 19,231

11 Claims. (Cl. 301—108)

The present invention relates to vehicle wheels and more particularly to the combination with a wheel of an attaching clip adapted to detachably connect a cover or hub cap to the wheel. In one form of the invention the detachable clip is formed from a single wire strand bent into generally U shaped formation and otherwise deformed to effect resilient engagement with a hub cap or cover. In another form of the invention the attaching clip is designed to be sprung into interlocking engagement with the wheel by inserting a portion thereof into an opening formed in the wheel for that purpose.

The details of the apparatus embodying the invention and various alternative forms of the invention are disclosed in the following description read in connection with the accompanying drawing wherein:

Figure I is a partial front view in elevation of a wheel provided with resilient attaching clips adapted to detachably connect a cover or hub cap thereto;

Figure II is a sectional view of the construction illustrated in Figure I taken on substantially the line II—II thereof;

Figure III is a side view of the attaching clip illustrated in Figures I and II;

Figure IV is an end view of the attaching clip;

Figure V is a plan view of the attaching clip;

Figure VI is an enlarged view of a portion of the wheel showing the opening into which a portion of the attaching clip is inserted;

Figure VII is a partial sectional view of a wheel and attaching clip illustrating a modified form of clip and arrangement for connecting the same to the wheel; and Figure VIII is a front view of the construction illustrated in Figure VII.

The wheel illustrated in Figures I and II is a typical example of the type of vehicle wheel now in common use for passenger cars. It consists of a one piece wheel body having a conventional drop center rim 10 attached to its periphery by rivets 11. The wheel body is divided into three zones. The outer zone includes the spokelike rib portions 12 which are separated by perforations 13 and the nave portion 14. The inner zone consists of a bolting on flange 15 having a central opening therein for the reception of a hub and provided about said central opening with similar openings 16 for the reception of stud bolts or cap screws which serve to attach the wheel to the hub in a conventional manner. The intermediate zone consists of the annular portion 17 connecting the bolting on flange 15 to the nave 14.

The bolting on flange 15 is provided at circumferentially spaced intervals with H shaped openings 18. Each of these openings is adapted to receive a portion of one of the attaching clips 19. The clips 19 are formed from a single strand of wire bent into generally U shape form as clearly shown in Figures IV and V. The legs of clips 19 at their free extremities are preferably more widely spaced apart than throughout the remainder of the clip. The clips 19 are attached to the wheel by pressing the free extremities thereof together and inserting the portions 20 through the narrow portion of opening 18. After the portions 20 have been inserted into the opening 18 the legs of the clip spring back into their normal position as shown in Figure I. In this manner the clip is securely but detachably connected to the wheel.

The portions 20 of clip 19 contact the axially inner surface of bolting on flange 15 adjacent the opening 18. The legs of clip 19 adjacent the portions 20 are deformed to provide portions 21 and 22 which contact the axially outer surface of flange 15 adjacent the opening 18 when the clip is installed as shown in Figure II.

Both legs of clip 19 are deformed adjacent the outer extremity of the clip to provide the raised portions 23 adapted to resiliently engage the edge of hub cap 24 when it is pressed axially toward the wheel. The clips 19 are preferably arranged to lie in relatively close proximity to the annular portion 17 of the wheel when they are installed as shown in Figure II. The edge of hub cap 24 is thus firmly locked in position between the clips 19 and the annular portion 17 when in its attached position.

In the modified form of construction illustrated in Figures VII and VIII the bolting on flange 25 is provided with a pair of radially spaced apart openings 26 and 27. The attaching clip 28 is in the form of a wire strand bent into generally U-shaped form having its inner extremity 29 folded back upon itself as shown in Figure VII. The legs of clip 28 adjacent their free extremity are bent so that portions 29 are normally spaced from the adjacent body portions more widely than the spaced openings 26 and 27.

The clip 28 is attached to the bolting on flange 25 by pressing the portions 29 and the body portion of the clip together sufficiently to permit the insertion of the opposite extremities of the clip (not of the strand of wire) into openings 26 and 27. The extremities of clip 28 are of course inserted into openings 26 and 27 from the rear or righthand side of the bolting on flange 25. After the clip has been inserted into these openings the portions 29 tend to spring away from the body of the clip and assume the position shown in Figure VII.

The free extremities of the legs of clip 28 are bent as indicated at 30 to prevent the accidental dislodgement of the clip after it has been installed as just described. The deformation in the legs of clip 28 at 31 and 32 serve a similar purpose and hold the clip firmly in position. Adjacent its outer extremity the clip 28 is provided with a deformation 33 comparable to the deformation 23 of clip 19. Deformation 33 is adapted to resiliently engage a hub cap whereby to detachably connect the hub cap to the wheel.

In both of the illustrative forms of the invention herein shown and described the attaching clip is detachably connected to the wheel by means of the interlocking configuration of the wheel and attaching clip. No rivets or other securing devices are needed for attaching the clips to the wheel. This manner of connecting the attaching clips to the wheel is very economical and makes possible the application of the attaching clip to the wheel at the time the wheel is ready for installation on a vehicle or even after the wheel has been installed on a vehicle. Where attaching clips are permanently attached to the wheel as in the past they frequently become broken or distorted in the handling and storing of the wheels before the wheels are mounted on a vehicle. The present invention eliminates that disadvantage.

The scope of the invention is indicated in the appended claims.

I claim:

1. In a vehicle wheel, a resilient attaching clip adapted to detachably connect a cover to the wheel, a portion of said attaching clip intermediate its extremities contacting the surface of the wheel at one side thereof and the remainder of the attaching clip being disposed at the opposite side of the wheel in contacting relation therewith at spaced points.

2. In a vehicle wheel provided with an opening of irregular shape, a wheel cover attaching clip having normally spaced apart legs adapted to be sprung into interlocking engagement with the wheel by pressing said legs together and inserting the same into said opening.

3. In a vehicle wheel provided with an H-shaped opening, an attaching clip adapted to detachably connect a cover to said wheel comprising spaced apart legs provided with looped portions intermediate their extremities and adapted to be pressed together to permit the insertion of said legs into the narrow portion of said opening, said legs after insertion into said opening adapted to resume their normal spaced relation whereby to effect an interlocking engagement with the wheel adjacent said opening.

4. In a vehicle wheel provided with a pair of adjacent openings, a resilient attaching clip extending axially of said wheel and adapted to detachably connect a cover to said wheel and provided with portions adjacent one end thereof normally more widely spaced than said spaced openings, said spaced portions of the attaching clip adapted to be sprung together sufficiently to permit the insertion of the same into said openings whereby to detachably connect the clip to the wheel.

5. In a vehicle wheel provided with an opening therein, means for detachably connecting a wheel cover to said wheel comprising an attaching clip extending axially of said wheel and in the form of a single strand of wire bent into generally U-shaped form with its free extremities deformed to effect interlocking engagement with said opening, the opposite extremity of said clip being deformed to resiliently engage a cover when said cover is pressed axially toward said wheel.

6. In a vehicle wheel provided with a pair of adjacent openings, an elongated wheel cover attaching clip having one end deformed to engage both of said openings in such a manner that both ends of said clip are disposed on one side of said wheel and an intermediate portion on the other side of said wheel, the deformed end of said clip being normally of a configuration not suitable for engagement with said openings but adapted to be distorted to effect engagement therewith.

7. In a vehicle wheel provided with spaced elongated openings, a resilient attaching clip having one end folded back upon itself to provide a loop normally too large to permit insertion through said openings but adapted to be compressed to permit insertion through both of said openings.

8. An article of manufacture for assembly in a vehicle wheel comprising a single strand of wire arranged with the ends adjacent each other and remote from the middle portion of said strand, the ends of said strand being deformed for resilient engagement with a vehicle wheel and the middle portion thereof being deformed for resilient engagement with a wheel cover.

9. In a vehicle wheel provided with a pair of parallel adjacent elongated openings and an opening connecting the two, an elongated wheel cover attaching clip having a pair of legs at one end deformed to permit the insertion of a portion of said legs intermediate the ends thereof through said shorter opening when said legs are sprung toward each other, whereby said clip is secured to the wheel with both ends thereof disposed on one side of the wheel and an intermediate portion is disposed on the opposite side thereof.

10. The combination with a wheel having an element thereof provided with a pair of adjacent cooperating openings of means for detachably connecting a cover to the wheel comprising an elongated resilient attaching clip consisting of a single strand of wire bent back upon itself to bring its ends adjacent each other, the end of the clip adjacent the free ends of the wire being sprung into engagement with said openings with portions of the clip located on opposite sides of the element containing the openings, the opposite end of the clip projecting axially outwardly from the wheel and being deformed to effect resilient engagement with a cover when it is pressed axially toward the wheel.

11. The combination with a wheel having an element thereof provided with a pair of adjacent cooperating openings of means for detachably connecting a cover to the wheel comprising a resilient attaching clip having one end projecting axially from the wheel and the other end extending through said openings to locate the opposite ends of the clip on one side of the element containing the openings and an intermediate portion adjacent the axially inner end of the clip on the other side of said element.

HARRY J. HORN.